United States Patent [19]

Costanza et al.

[11] Patent Number: 5,204,620
[45] Date of Patent: Apr. 20, 1993

[54] PHOTORECEPTOR MOTION SENSOR USING A SEGMENTED PHOTOSENSOR ARRAY

[75] Inventors: Daniel W. Costanza; William J. Nowak, both of Webster; Robert P. Loce, Rochester, all of N.Y.

[73] Assignee: Xerox Corporation, Stamford, Conn.

[21] Appl. No.: 863,893

[22] Filed: Apr. 6, 1992

[51] Int. Cl.⁵ .............................................. G01P 3/36
[52] U.S. Cl. .................................... 324/175; 250/571
[58] Field of Search ............... 324/175, 160; 250/561, 250/571

[56] References Cited

U.S. PATENT DOCUMENTS 4,837,636 6/1989 Daniele et al. .................... 358/300

OTHER PUBLICATIONS

"Sampling Thereon for Geometric Moment Determination and Its Application to a Laser Beam Position Detector" Robert P. Loce et al., Applied Optics, vol. 29, No. 6, Sep. 10, 1990, pp. 3835-3843.

Primary Examiner—Walter E. Snow

[57] ABSTRACT

The actual position and velocity of a photoreceptor belt is accurately measured by sensing the passing of illuminated holes in the belt, as the belt moves in a process direction. A segmented sensor array is positioned so as to view the passing of the illuminated holes. A Gaussian light intensity distribution is sensed by a group of sensor pixels which sense the light during a sampling interval. The array produces an output which is operated upon by a centroid processor to determine the center of moment for each sampled intensity distribution. A prediction is then made for projected position of the belt which is very accurate since the centroid calculation is not effected by noise produced by stray light or poorly defined image edges.

6 Claims, 4 Drawing Sheets

PHOTORECEPTOR MOTION SENSOR USING A SEGMENTED PHOTOSENSOR ARRAY

The present invention relates to a motion sensor for sensing displacement and velocity variations of a photoreceptor belt used as the image recording member of a copier or printer and, more particularly, to a motion sensor which incorporates a linear segmented array and associated ciruitry for precisely determining the velocity and position variations of the belt.

A serious problem in prior art document reproduction machines is a phenomena referred to as "banding". Banding is a defect observable in output copies resulting from velocity variations in the speed of the moving photoreceptor. The velocity variations create a misplacement of scan image lines in the slow scan or process direction. For many printer applications, the output copies must be virtually band free, requiring holding velocity variations to less than 1%, which is in the order of 1 micron spatial variation at certain frequencies and for certain systems. In addition, newer printers incorporating light scanning sources, such as Raster Output Scanners (ROS) or image bars, create successive color exposure frames on a photoreceptor during a single pass. The leading edges of each of the successive color images must be in registration, within tolerances of approximately 125 microns (0.005 inch). This precise tolerance requirement, in turn, necessitates a very accurate spacing between exposure frames; ideally the separation between two frames should be an integer number of scan lines apart and, therefore the spacing must be accurate to within a similar fraction of a raster line width, or about 40 to 80 microns.

The present invention is directed towards an improved method for detecting photoreceptor velocity displacement variation and for generating precise signals which are used to compensate for the photoreceptor speed and position. The invention represents an improvement over the prior art motion sensing techniques disclosed, for example, in U.S. Pat. No. 4,837,636, whose contents are hereby incorporated by reference. The '636 patent disclosed the use of a linear CCD array which sensed the edge of the image of a plurality of holes projected onto the array. However, intensity variations between projected images and noise produced by stray light and poorly defined line edges reduced the ability to precisely define the edge, and, therefore, accurately characterized the image velocity within the accuracies required. Further, the resolution of the measurement system was limited to the resolution of the CCD array. The present invention presents an improvement by using a centroid algorithm to calculate projected hole positions. This approach is less sensitive to uniformity variations and noise, and exceeds the resolution of the segmented array of the prior art by at least an order of magnitude. More particularly, the present invention relates to a method for determining the velocity of a photoreceptor belt moving in a process direction, said photoreceptor belt characterized as having a series of apertures along an edge extending in a row which is parallel to said process direction, the method comprising the steps of:

positioning an illumination source adjacent said photoreceptor belt so that a band of illumination is directed along said row of apertures, at least two of said apertures being simultaneously illuminated, placing a segmented position sensor on the side of the photoreceptor opposite that occupied by said illumination source, said position sensor aligned so that illumination from said illumination source is viewed over a group of sensor segments through at least two of said apertures as the photoreceptor belt moves therepast, said sensors producing output signals representing the light distribution intensity sensed by said group of sensor signals during a sampling period, calculating the centroid positions of said intensity distributions, and calculating the velocity of the belt using the centroid position information from at least two sampling periods.

DESCRIPTION OF THE INVENTION

Figure 1:
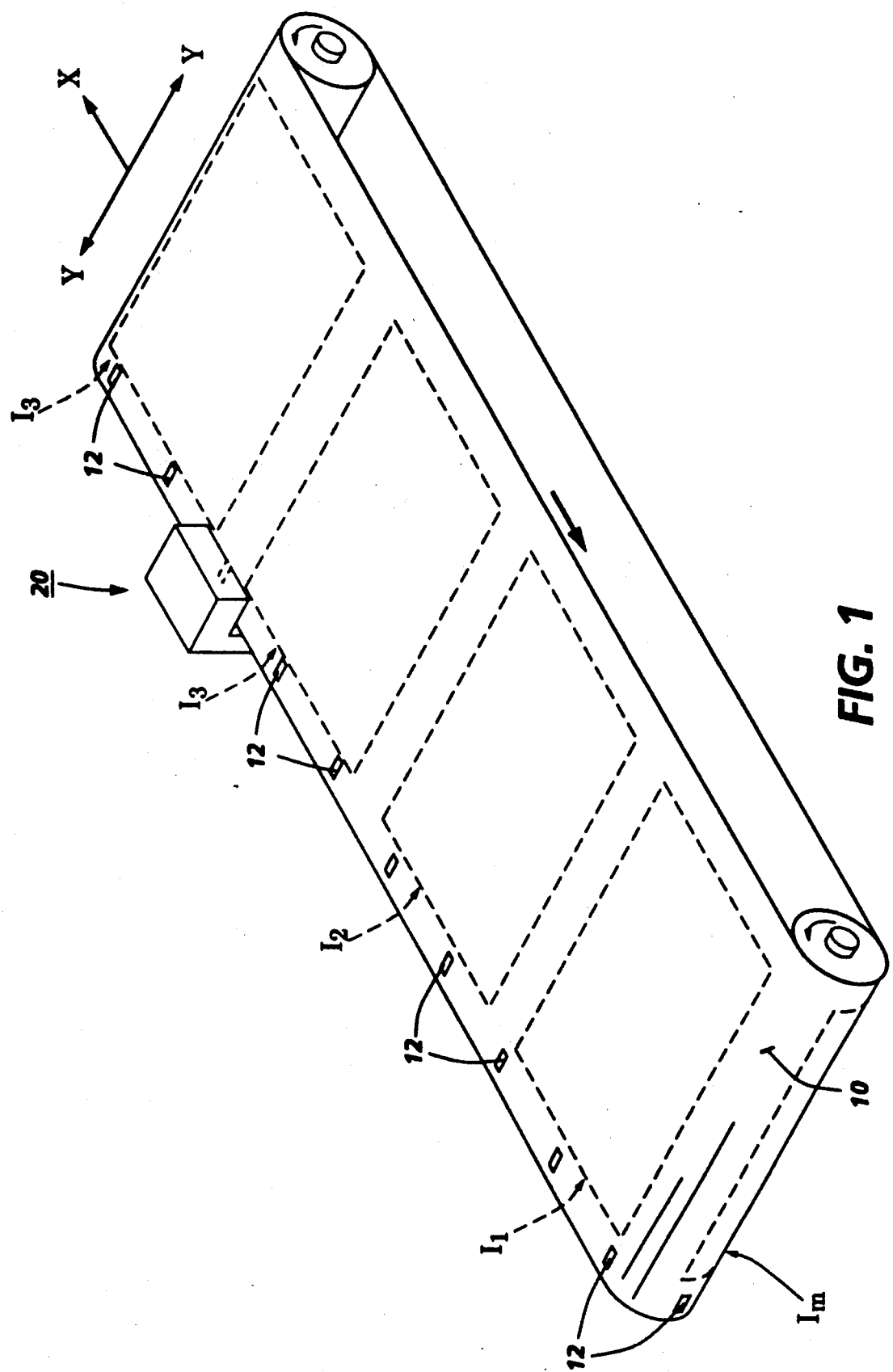
FIG. 1 is a top perspective view of the motion sensor detector apparatus positioned adjacent a photoreceptor belt in a printing environment.
Figure 2:
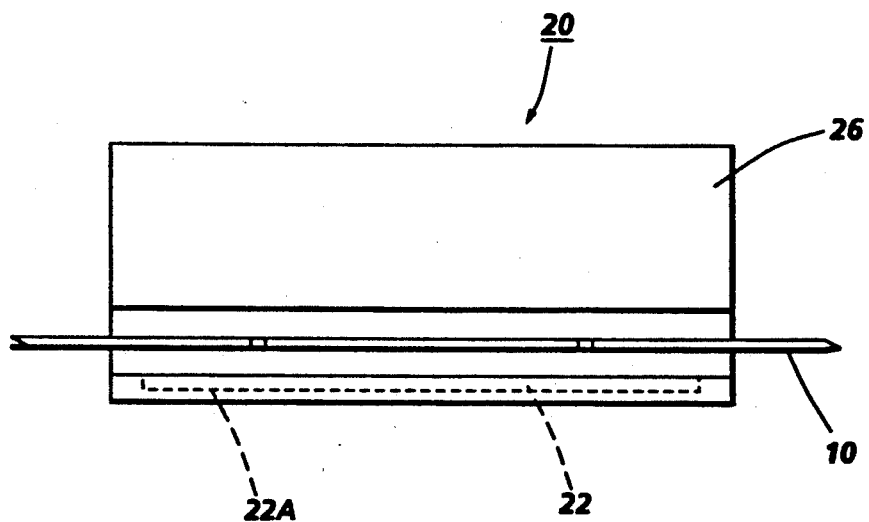
FIG. 2 is a side view of the motion sensor detection apparatus.
Figure 3:
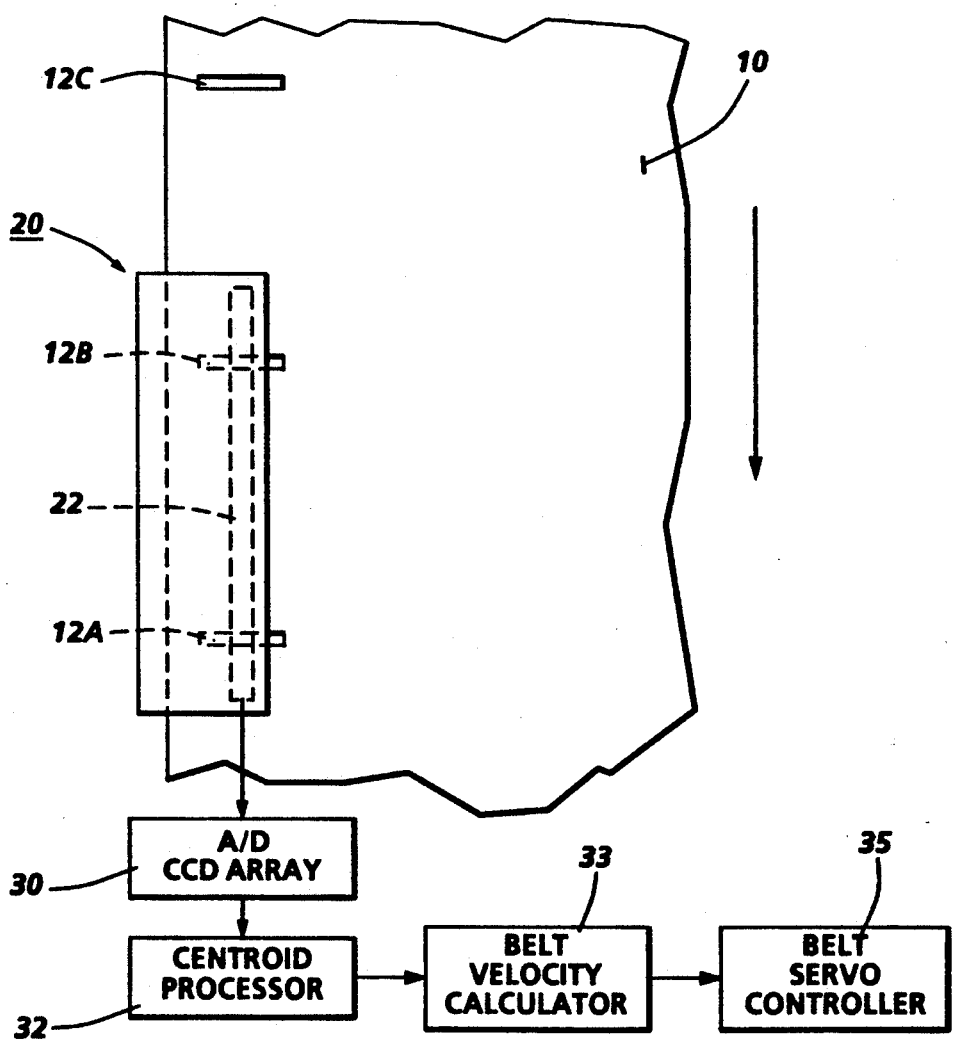
FIG. 3 is a top view of FIG. 2 combined with a block diagram of the sensing and calculation circuitry.
Figure 4:
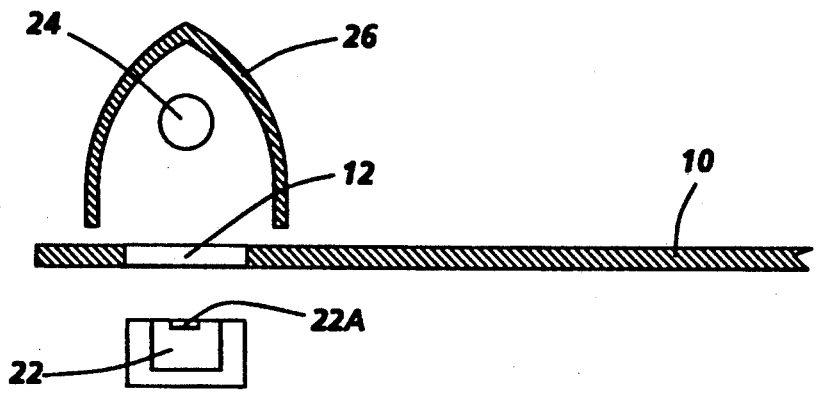
FIG. 4 is an end view of FIG. 2.

FIG. 1 shows a photoreceptor 10 having a length sufficient to accept an integral number of full page image areas $I_1$-$I_n$, represented by dashed lines. These image areas are formed by exposure from an appropriate scanning source such as a Raster Output Scanner (ROS) or a linear LED print bar array, as is known in the art. The belt is charged and exposed in a multiple pass mode or in a single pass mode. For either form of usage, conventional xerographic stations (charge, development, transfer, fusing cleaning) are located in belt proximity, as is conventional in the prior art. Use in a single pass system requires a set of charge and development stations associated with each image frame. Details of this type of system in an LED environment are disclosed in U.S. application Ser. No. 07/807,931, assigned to the same assignee as the present invention. The contents of this application are hereby incorporated by reference. In the multi-pass (black only) environment, variations in the velocity of belt 10 would result in the aforementioned banding defined in output prints. In a single pass color system, position variations would also result in misregistration of the image areas $I_1$-$I_n$. According to the present invention, a plurality of holes 12 are formed in a row along one edge of belt 10, outside the image area. The holes 12 extend around the circumference of belt 10 and lie in a row parallel to the process direction. A hole sensing system 20 is positoned as shown in FIG. 1. FIG. 2 shows a side view of system 20 and a portion of the belt. FIG. 3 shows a top view and FIG. 4 an end view. As shown in FIGS. 2-4, system 20 comprises a linear segmented array 22 which, in a preferred embodiment, is a CCD array, but may take other forms of segmented position sensors with analog or digital output, such as fiber optic bundles or other light pipe devices which address individual photodiodes. Array has a plurality of pixels 22A arranged in a linear row. The longitudinal axis of the row of pixels 22A is substantially parallel to the axis of movement of holes 12, the optical center of pixels 22A is in line with the center of each hole 12. Lamp 24 has an aperture length which is at least sufficient to provide substantially equal illumination along the entire length of array 22, with the longitudinal axis of array 22 being substantial parallel to the longitudinal axis of lamp 24. Holes 12 are separated by a distance such that the hole-to-hole spacing is less than the length of array 22. Array is mounted in a predetermined space relationship beneath belt 10 and in the viewing nip of light from lamp 24, directed through each of the holes 12.

In operation, photoreceptor motion is sensed by monitoring the position of holes 12 illuminated by lamp 24, as sensed along the length of array 22. The light passing through each hole is transmitted by a relay lens (not shown) and imaged onto the array 22. The imaged holes, which are approximately Gaussian in cross-section, move across the array as shown in FIG. 6. The light irradiance distribution of the imaged holes is sampled and the centroid of the distribution is calculated by using a centroid algorithm described in further detail below.

Figure 5:
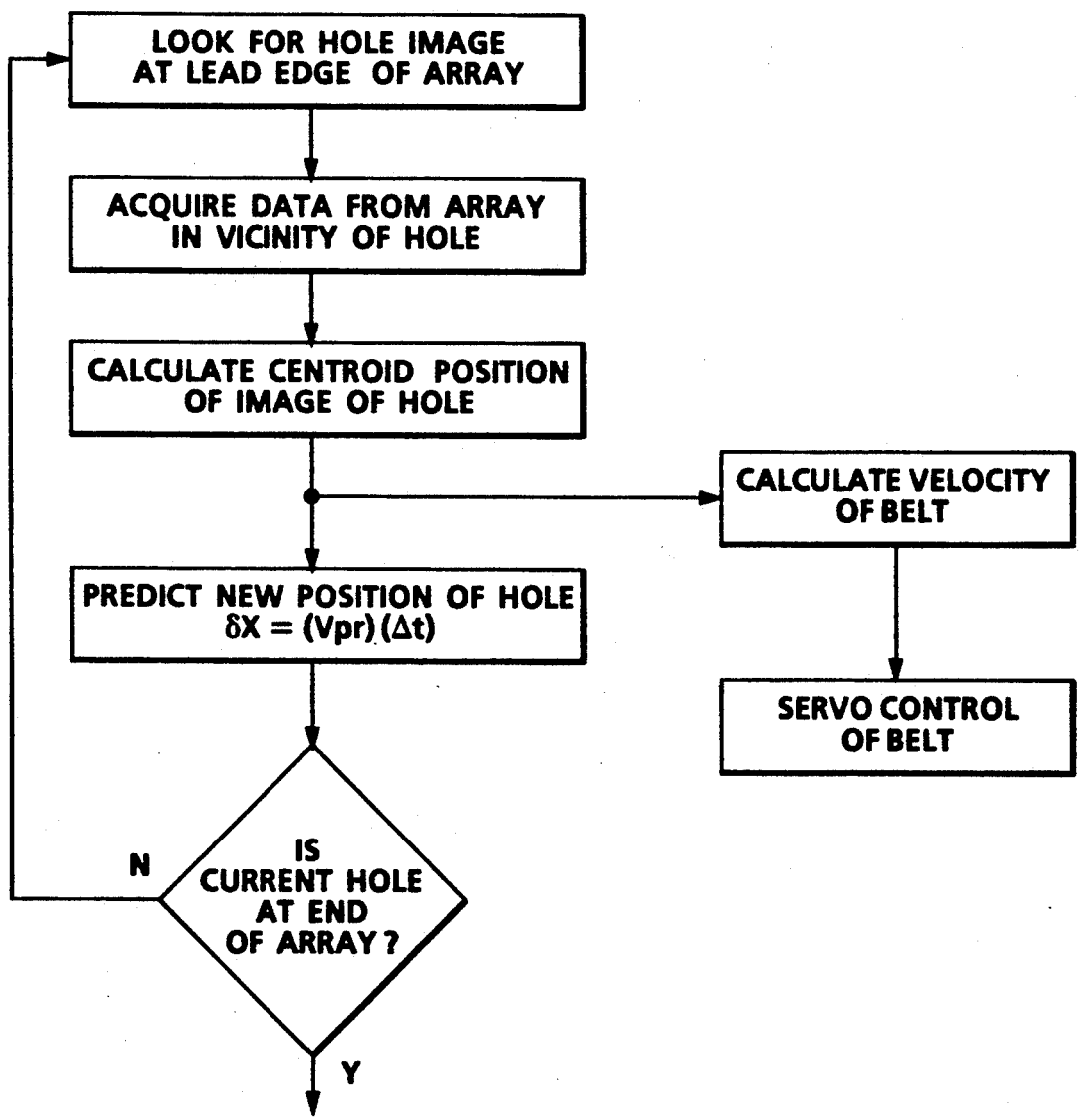
FIG. 5 is a functional flow chart showing the application of a centroid processor to the outputs of the light detector.

FIG. 5 shows the flow diagram which is used to track the position of the belt. Referring to FIGS. 3 and 5, as hole 12A moves over the lead edge of array 20, the illumination sensed by each of the array pixels within the viewing nip of lamp 24, which is substantially Gaussian, is measured during a sampling period, and the voltage developed by any one of the capacitors of the array is proportional to the time average light intensity of the lamp as viewed through the aperture. The pixel arrays are interrogated in parallel in a preferred embodiment, and a segmented data stream consisting of voltage measurements proportional to the light intensity distribution incident upon the corresponding sensors is generated. The data stream output is then digitized in A/D convertor 30 and the irradiance distribution centroid is calculated in centroid processor 32. As hole 12B moves across the leading edge of array 20, a number of pixel elements view the lamp 24 output. Data in the array begins to be clocked out at the chosen sampling rate. The sampling rate, identified as $\Delta t$, will vary depending on the number of pixels in the array, the clock speed of the shift register in the array, the time to perform the centroid calculations, and whether the array has parallel or serial addressability. The logic design of FIG. 5 is for an array that uses parallel addressability for each pixel. The intensity distribution along the vertical axis of array 20 is Gaussian; i.e. bell shaped, and the centroid appears at its peak. This characteristic has the advantage over prior art methods, in that the signals are not strongly affected by noise.

Continuing with the description, the data from array 20 is digitized using A/D convertor 30. 8 bits has proven to be sufficient. The output is sent to centroid processor 32, which contains the circuitry for performing the calculations for the sampled distribution. The centroid is derived according to the expression:

$$\text{Centroid} = \frac{\sum_{m=1}^{M} I_m X_m}{\sum_{m=1}^{M} I_m} \quad (1)$$

where:
$I_m$ = the irradiance at pixel m,
$X_m$ = the position of pixel m, and
M = total number of pixels being illuminated during sampling interval.

The derivation of this formula is found, for example, in an article entitled, "Sampling Theorem for Geometric Moment Determination and its Application to a Laser Beam Position Detector", by Robert Loce and Ronald Jodoin, published in Applied Optics, Vol. 29, No. 6, Sep. 10, 1990.

Figure 6A:
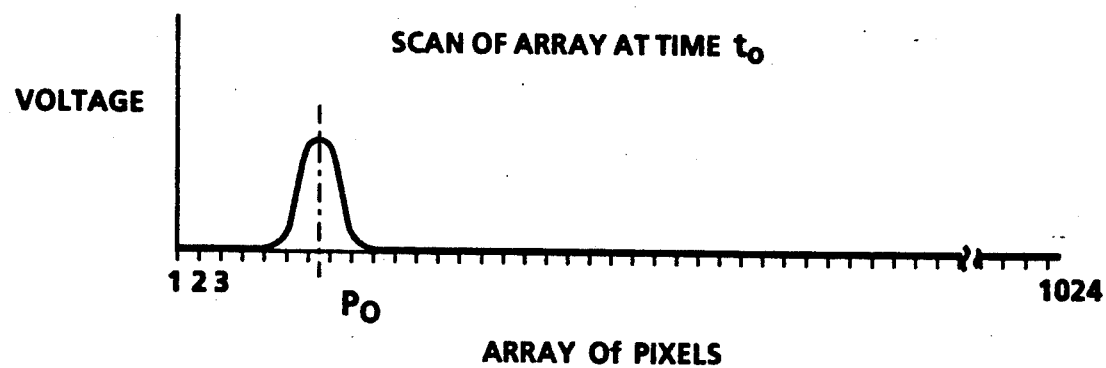
FIGS. 6a and 6b show scans of a pixel array at two different times.
Figure 6B:
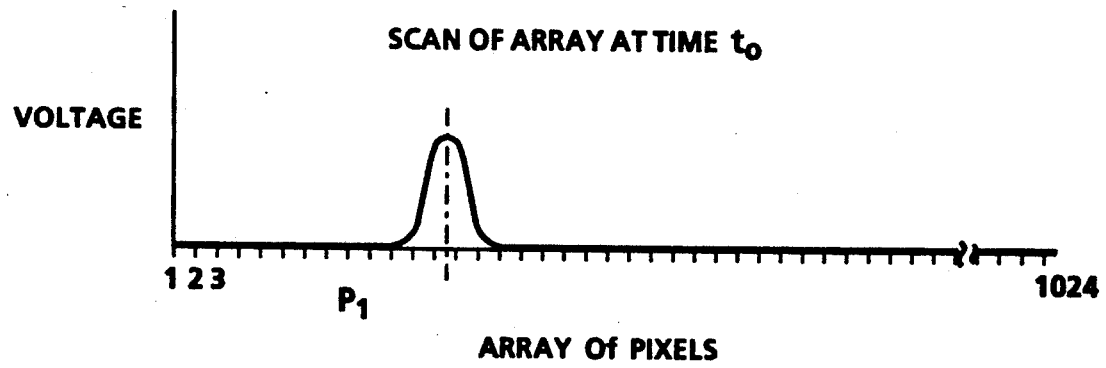

Thus, in considering FIG. 6, there is shown in FIG. 6a a scan of array 22, through hole 12a, at a time $t_0$. By equation 1, the hole centroid is found to occur at the pixel designated as $P_0$. This would be equivalent to a pixel m in equation 1. This hole position is calculated to a fraction of the pixel spacing, conventionally 100 microns. FIG. 6b shows a scan at a time $t_1$, the hole centroid using equation 1 at pixel $P_1$. Belt velocity ($V_{pr}$) can thus be calculated by the equation:

$$V_{pr} = \frac{(P_1 - P_0)(\Delta x)}{t_1 - t_0} \quad (2)$$

where: $\Delta x$ = pixel spacing

The velocity of the belt is thus updated each time the array is scanned (during every time interval $\Delta t$). Either the velocity or incremental belt displacement can then be fed back to a servo system controlling the speed and position of the belt. The displacement and velocity are adjusted by comparing the measured velocity ($V_{p0}$) and or the incremental displacement ($\delta x_i$) to the correct velocity and incremental position of the belt. Alternatively, the actual belt position can be used uncorrected and the leading edge of images $I_1$-$I_n$ can be adjusted. For serial processing, the belt velocity must be actually calculated with each measurement. However, for the parallel processing mode, the initial centroid location data can be used to predict appropriate locations of successive hole positions using the expression:

$$\delta X = (V_{pr})(\Delta t) \quad (3)$$

This calculation allows only a portion of the CCD array to be interrogated which speeds processing time. In other words, a smaller number of sampling periods are required since the prediction of the centroid location will be accurate enough to allow interrogation of a small group of pixels at a predetermined future position. For example, for a time $\Delta t$ of 0.0001 sec. and a $V_{pr}$ at 10 inches/sec., a measurement of the photoreceptor position would occur every 0.001 inches.

Equation 3 can also be used to determine when the leading holes reach the end of the array and begin to exit the sensing area (FIG. 7). A calculation is made to determine which pixel on array 20 will view the next hole entering the leading edge of the array. The sensing calculations are then transferred from this pixel group to the pixel group which will view the next hole about to enter the lead edge of the sensor array. This calculation is made as a function of the hole spacing on the photoreceptor divided by the array pixel spacing. The accuracy of this measurement technique is dependent on the number of CCD pixels 22A that are contained in the full width-half max of the hole image presented onto the CCD array and the full width-half max dimension and, under certain circumstances, has been measured to less than 0.5 microns. A sample design that would yeild this accuracy and be practical with respect to manufacturability and machine robustness is as follows. Hole 12 punched in the belt would be 0.5 mm to allow easy punching and prevent clogging with toner. For 1×i- maging optics, a CCD spacing of 100 microns would yield the desired accuracy (<0.5 microns) for a CCD or similar sensing array having S/N ratio of >200. Holes punched approximately every inch would allow for array lengths of less than 2 inches, or 1024 elements. Using a centroid algorithm to determine projected image position has been shown analytically and empirically to be less sensitive to uniformity variations and noise, and exceeds the resolution of the segmented sensor by at least an order of magnitude. This is a significant improvement over the prior art. This invention is not limited to the use of CCD array sensors. It can be applied to any form of segmented position sensor with digital or analog output, to fiber optic bundles, or other "light pipe" devices addressing individual photodiodes.

While the invention has been described with reference to the structures disclosed, it is not confined to the details set forth, but is intended to cover such modifications or changes as they come within the scope of the following claims.

For example, while the apertures formed in the belt comprise equally spaced holes 12, other non-circular apertures could be used with different spacings therebetween. Further, the "aperture" could also be a light transmissive segment formed in the belt. The velocity of the belt is determined by the movement of the same target across the array, irrespective of shape or size.

What is claimed is:

1. A method for determining the velocity of a photoreceptor belt moving in a process direction, said photoreceptor belt characterized as having a series of apertures along an edge extending in a row which is parallel to said process direction, the method comprising the steps of:

positioning an illumination source adjacent said photoreceptor belt so that a band of illumination is directed along said row of apertures, at least two of said apertures being simultaneously illuminated, placing a segmented position sensor on the side of the photoreceptor opposite that occupied by said illumination source, said position sensor aligned so that illumination from said illumination source is viewed over a group of sensor segments through at least two of said apertures as the photoreceptor belt moves therepast, said sensors producing output signals representing the light distribution intensity sensed by said group of sensor signals during a sampling period, calculating the centroid positions of said intensity distributions, and calculating the velocity of the belt using the centroid position information from at least two sampling periods.

2. The method of claim 1 further including the step of predicting future positions of said aperture as said belt moves at said process speed, said new position signals reflecting the actual speed of the belt.

3. The method of claim 2 further including the steps of:

determining the time at which an aperture being viewed by said sensor is approaching the end of the sensor, and shifting the sampling from the group of pixels viewing said exiting aperture to the array of pixels which will come into view of the aperture about to enter the leading edge of said sensor array.

4. The method of claim 1 including the further step of using said velocity calculations to correct the belt velocity and or position.

5. In a printer having a photoreceptor belt moving in a process direction, said photoreceptor belt characterized as having a series of apertures along an edge extending in a row which is parallel to said process direction, the combination of:

an illumination source positioned adjacent said photoreceptor belt so that a band of illumination is directed along said row of apertures, at least two of said apertures being simultaneously illuminated, a segmented position sensor array on the side of the photoreceptor opposite that occupied by said illumination source, said position sensor aligned so that illumination from said illumination source is viewed over a group of sensor segments through at least two of said apertures as the photoreceptor belt moves therepast, means for producing output signals representing the light distribution intensity sensed by said group of sensor signals during a sampling period, means for calculating a plurality of centroid positions of each intensity distribution, and means for calculating the belt velocity based upon comparison of successive centroid positions.

6. The printer of claim 5 further including means for predicting future centroid positions as said belt moves at said process speed.

* * * * *